(12) United States Patent
Ijima

(10) Patent No.: US 7,511,481 B2
(45) Date of Patent: Mar. 31, 2009

(54) VARIABLE RELUCTANCE TYPE ANGLE DETECTOR

(76) Inventor: Yasuo Ijima, 3-34-8, Shinsenriminami-machi, Toyonaka-shi, Osaka (JP) 565-0084

( * ) Notice: Subject to any disclaimer, the term of this patent is extended or adjusted under 35 U.S.C. 154(b) by 114 days.

(21) Appl. No.: 11/787,374

(22) Filed: Apr. 16, 2007

(65) Prior Publication Data

US 2007/0247142 A1    Oct. 25, 2007

(30) Foreign Application Priority Data

Apr. 19, 2006  (JP) .............................. 2006-115393

(51) Int. Cl.
*G01B 7/30* (2006.01)
*H01F 5/00* (2006.01)
(52) U.S. Cl. .............................. 324/207.25; 324/207.17
(58) Field of Classification Search ............ 324/207.15, 324/207.16, 207.17, 207.25; 310/68 B, 162, 310/168; 318/661; 336/135
See application file for complete search history.

(56) References Cited

U.S. PATENT DOCUMENTS

| 3,641,467 | A | * | 2/1972 | Ringland et al. ................ 336/5 |
| 4,631,510 | A | * | 12/1986 | Nagarkatti et al. .......... 336/135 |
| 5,757,182 | A | | 5/1998 | Kitazawa |
| 6,930,423 | B2 | * | 8/2005 | Kitazawa ..................... 310/168 |
| 7,215,116 | B2 | * | 5/2007 | Nishimura ............. 324/207.25 |
| 7,268,537 | B2 | * | 9/2007 | Nakano et al. ......... 324/207.25 |
| 7,408,340 | B2 | * | 8/2008 | Ijima ..................... 324/207.25 |

FOREIGN PATENT DOCUMENTS

JP    8-178611    7/1996

* cited by examiner

*Primary Examiner*—Kenneth J Whittington
(74) *Attorney, Agent, or Firm*—Jordan and Hamburg LLP

(57) ABSTRACT

A variable reluctance type angle detector 1 with a rotor 5 and a stator 4. The rotor 5 is provided rotatably on the stator 4. The stator 4 has twelve teeth 2 disposed circumferentially. An excitation wire 7, a SIN output wire 8, and a COS output wire 9 are wound around the teeth 2.

1 Claim, 5 Drawing Sheets

VARIABLE RELUCTANCE TYPE ANGLE DETECTOR

BACKGROUND OF THE INVENTION

1. Field of the Invention

This invention relates to a variable reluctance type angle detector having a rotor having such a shape that a gap permeance varies in a sine wave fashion with respect to an angle θ, the rotor being provided rotatably on a stator having teeth on which an excitation wire and an output wire are wound.

2. Description of the Related Art

As a conventional variable reluctance type angle detector, one having a rotor provided rotatably inside a stator has been known. The stator has a stator core having twelve teeth projecting inward and disposed in a circumferential direction, for example. An excitation wire and two-phase output wires are wound around each of the teeth.

The excitation wire is wound around each of the teeth in such a fashion that polarities of the adjacent teeth are different from each other. The excitation wire wound around the teeth forms excitation coils. The two-phase output wires are wound around each of the teeth so as to achieve a SIN output and a COS output whose phases are different from each other by 90 degrees. The two-phase output wires that are wound around the teeth form output coils. The rotor has such an outer shape that the gap permeance varies in a sine wave fashion with respect to an angle θ. When the rotor is rotated, an excitation voltage supplied to the excitation wire is outputted from one of the output wires as a COS output voltage, while a SIN voltage is outputted from the other output wire. Such variable reluctance type angle detector is disclosed in JP-A-8-178611, for example.

FIG. 5 is a diagram schematically showing one example of conventional wire structure. In the wire structure, the excitation wire and the two-phase output wires are wound around the twelve teeth. In FIG. 5, the teeth are denoted by numbers 1 to 12 sequentially along a circumferential direction. The excitation wire is positively wound around each of the odd number teeth while being negatively wound around each of the even number teeth.

The output wires output a COS output voltage and a SIN output voltage. The output wire outputting the COS output voltage is wound positively and negatively in an alternate fashion along the circumferential direction to achieve the COS output. The output wire outputting the SIN output voltage is wound positively and negatively in an alternate fashion along the circumferential direction to achieve the SIN output.

In the conventional variable reluctance type angle detector, the three layers of the excitation wire and the two-phase output wires are wound around each of the teeth. Therefore, it is necessary to secure insulation at two interlayer parts in each of the teeth. In the conventional variable reluctance type angle detector, an enamel layer is formed on surfaces of the excitation wire and the two phase output wires. With such enamel layer, the interlayer parts are insulated from one another without an insulating layer being formed between adjacent layers. However, when the parts to be insulated are increased in number, probability of insulation failure due to stripping of the enamel layer or the like is increased.

SUMMARY OF THE INVENTION

This invention has been accomplished in view of the above-described circumstances. An object of this invention is to provide means for realizing, with a simple structure and at a low cost, a variable reluctance type angle detector which is highly reliable in insulation and produces a high output.

Other objects and effects of this invention will become apparent from the following detailed description.

A variable reluctance type angle detector according to this invention is provided with a 1×-rotor or a 3×-rotor having such a shape that a gap permeance varies in a sine wave fashion with respect to an angle θ, the rotor being provided rotatably on a stator having teeth on which an excitation wire and output wires are wound. The teeth are provided on the stator in such a fashion that first to twelfth teeth are sequentially disposed along a circumferential direction. The excitation wire is wound around each of the first, second, third, seventh, eighth, and ninth teeth in a concentrated fashion to generate an identical polarity and wound around each of the fourth, fifth, sixth, tenth, eleventh, and twelfth teeth in the concentrated fashion to generate a polarity that is reverse to the polarity of the first, second, third, seventh, eighth, and ninth teeth. The first output wire is wound around each of the second, fourth, and twelfth teeth in the concentrated fashion to generate an identical polarity and wound around each of the sixth, eighth, and tenth teeth in the concentrated fashion to generate a polarity that is reverse to the polarity of the second, fourth, and twelfth teeth. The second output wire is wound around each of the third, fifth, and seventh teeth in the concentrated fashion to generate an identical polarity and wound around each of the ninth, eleventh, and first teeth in the concentrated fashion to generate a polarity that is reverse to the polarity of the third, fifth, and seventh teeth.

According to this variable reluctance type angle detector, it is possible to achieve an output higher than that of conventional angle detectors by winding each of the first output wire and the second output wire for the number of times same as that of the conventional angle detectors. Therefore, it is possible to realize a downsized high-power variable reluctance type angle detector at a low cost. Also, since the two-layer coil is formed by winding the excitation wire and the first output wire or the second output wire around each of the teeth in this variable reluctance type angle detector, it is possible to reduce the number of insulation parts as compared to the conventional variable reluctance type angle detector in which the three-layer coils are formed. Thus, this variable reluctance type angle detector is increased in reliability for insulation.

DESCRIPTION OF THE PREFERRED EMBODIMENTS

Hereinafter, this invention will be described with reference to the drawings and based on preferred embodiments.

Figure 1:
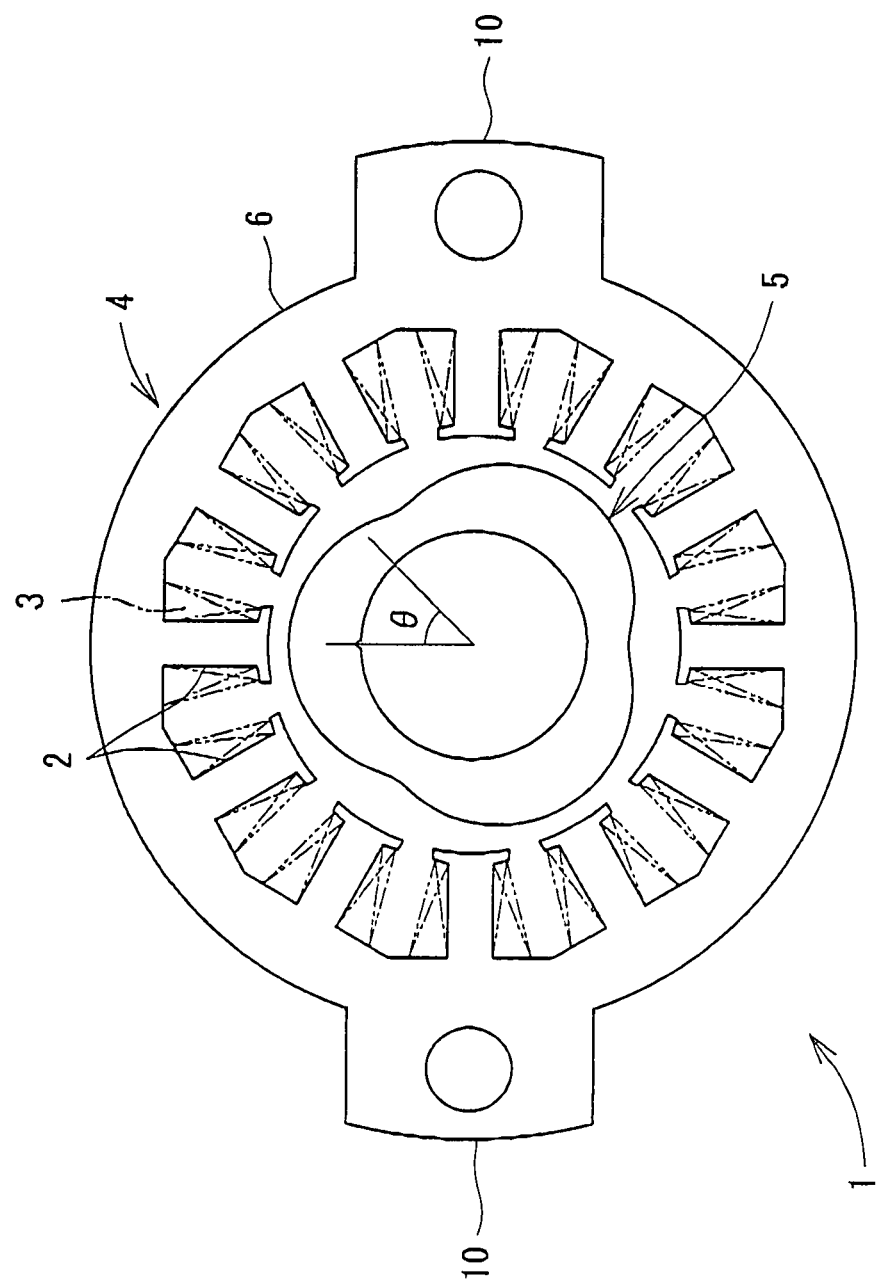
FIG. 1 is a plan view showing a major structure of a variable reluctance type angle detector 1 according to one embodiment of this invention.

Shown in FIG. 1 is a major structure of a variable reluctance type angle detector 1 according to one embodiment of this invention. As shown in FIG. 1, the variable reluctance type angle detector 1 is provided with a stator 4 and a rotor 5. The rotor 5 is disposed rotatably at the center of the stator 4. The stator 4 has twelve teeth 2 projected inward and disposed circumferentially. A coil 3 is wound around each of the teeth 2.

The stator 4 has a stator core 6. On the stator core 6, an excitation wire 7, a SIN output wire 8 (first output wire), and a COS output wire 9 (second output wire) are wound by a predetermined winding method. The excitation wire 7, the SIN output wire 8, and the COS output wire 9 form the coil 3. As shown in FIG. 1, an outer shape of the stator core 6 is substantially circular. The twelve teeth 2 are provided on an inner periphery of the stator core 6. The teeth 2 are projected radially inward from the inner periphery of the stator core 6. The stator core 6 is obtainable by: pressing a steel plate having a predetermined thickness into the shape as shown in FIG. 1, which is the shape viewed from above; stacking a plurality of the steel plates; and fixing the steel plates by caulking or the like to integrate the steel plates into one plate, for example. The excitation wire 7, the SIN output wire 8, and the COS output wire 9 are wound around each of the twelve teeth 2 by a predetermined winding method. Thus, the coil 3 is formed on each of the tooth 2. Details of the predetermined winding methods will be described later in this specification. A flange 10 is provided on an outer periphery of the stator core 6. The flange 10 is used for fixing the stator 4 at a desired position. The flange 10 may have an arbitrary structure.

As shown in FIG. 1, an outer shape of the rotor 5 is substantially circular. An outer periphery of the rotor 5 has the shape that is capable of varying a gap permeance between the rotor 5 and the stator 4 in a sine wave fashion with respect to an angle θ of a direction of rotation of the rotor 5. Like the stator core 6, the rotor 5 is obtainable by: pressing a steel plate having a predetermined thickness into the shape as shown in FIG. 1, which is the shape viewed from above; stacking a plurality of the steel plates; and fixing the steel plates by caulking or the like to integrate the steel plates into one plate, for example. A rotor shaft (not shown) is inserted into the center of the rotor 5. Though the rotor 5 of this embodiment is of a so-called axial double angle of 3× type which has projections at three points on the outer periphery, the axial double angle of the rotor 5 of this invention may be 1×.

Hereinafter, the details of the methods of winding the excitation wire 7, the SIN output wire 8, and the COS output wire 9 around the teeth 2 will be described.

Figure 2:
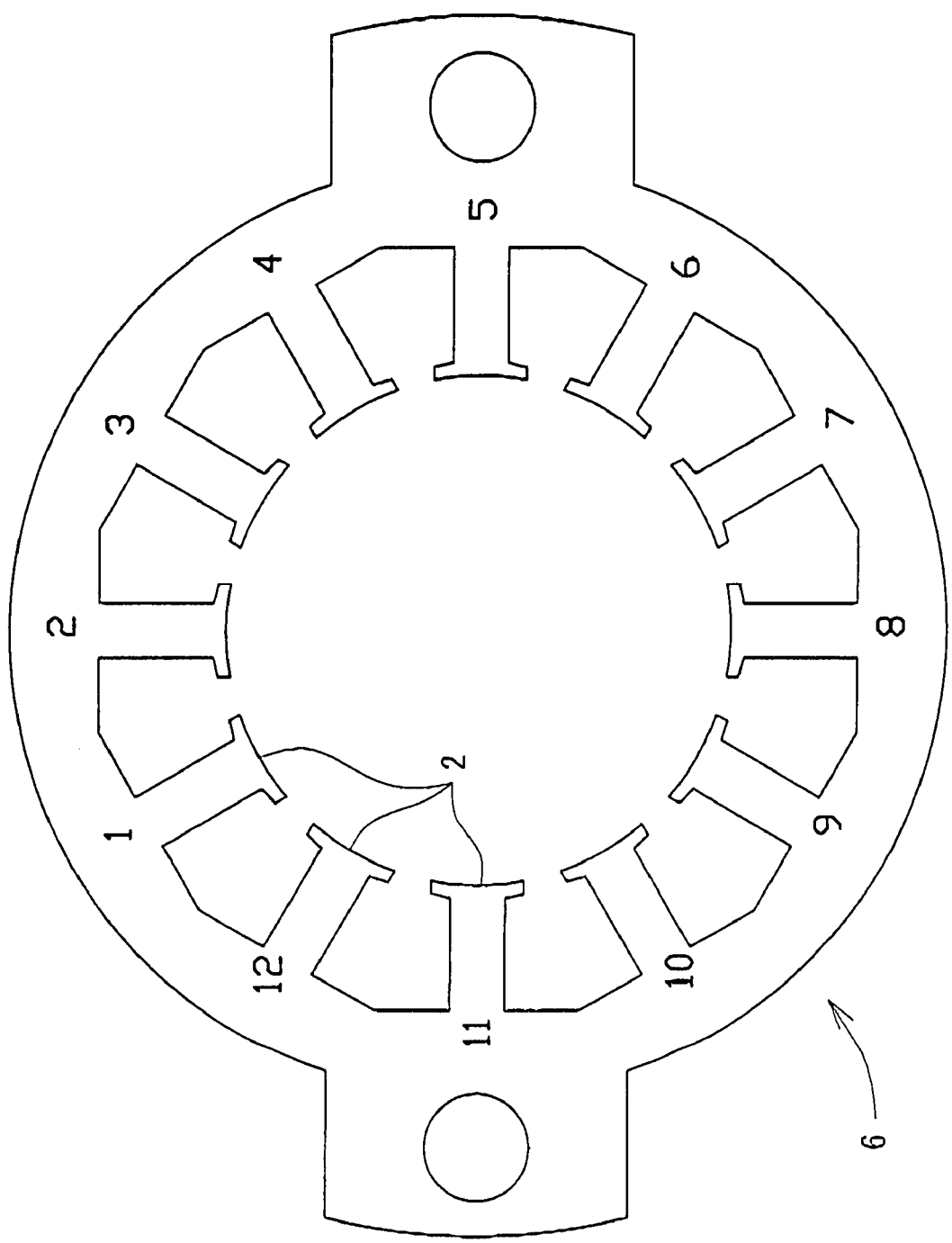
FIG. 2 is a schematic diagram showing one example of numbering for teeth 2.

In FIG. 2, numbers 1 to 12 are assigned to the twelve teeth 2 along a clockwise direction for convenience. Any one of the teeth 2 may be numbered by 1 (first tooth). The teeth numbered by 2 (second tooth) to 12 (twelfth tooth) are disposed in a clockwise direction from the tooth numbered by 1 (first tooth). The numbers 2 to 12 may be assigned in an anticlockwise direction from the tooth 2 numbered by 1. The numbers are assigned to the tooth 2 sequentially along the clockwise direction or the anticlockwise direction, and the numbering is in the ascending order. In this embodiment, the numbering is in the ascending order along the clockwise direction as shown in FIG. 2.

Figure 3:
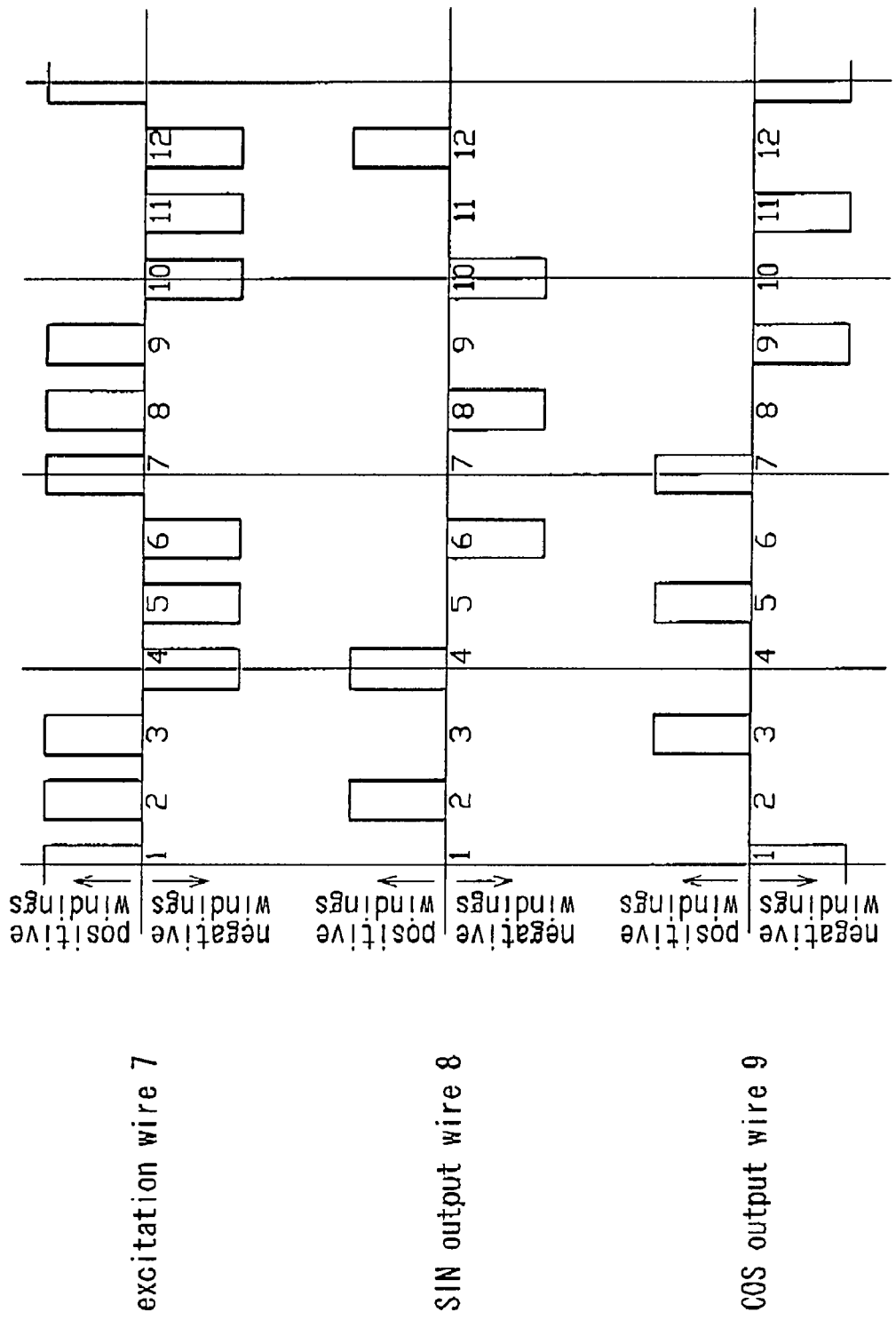
FIG. 3 is a schematic diagram for illustrating a method of winding an excitation wire 7, a SIN output wire 8, and a COS output wire 9.

As shown in FIG. 3, the excitation wire 7 is wound around each of the first, second, third, seventh, eighth, and ninth teeth 2 by a predetermined number of turnings (number of windings) in a concentrated fashion to generate an identical polarity. Also, the excitation wire 7 is wound around each of the fourth, fifth, sixth, tenth, eleventh, and twelfth teeth 2 by a predetermined number of turnings in the concentrated fashion to generate a polarity that is reverse to the polarity of the first, second, third, seventh, eighth, and ninth teeth 2. When the excitation wire 7 is positively wound around each of the first, second, third, seventh, eighth, and ninth teeth 2, the excitation wire 7 is negatively wound around each of the fourth, fifth, sixth, tenth, eleventh, and twelfth teeth 2. The excitation wire 7 is wound around each of the first to the twelfth teeth in series.

By thus winding the excitation wire 7, the excitation wire 7 is identical in polarity in the first, second, third, seventh, eighth, and ninth teeth 2, and the excitation wire 7 is identical in polarity in the fourth, fifth, sixth, tenth, eleventh, and twelfth teeth 2. Also, the polarity of the excitation wire 7 in the first, second, third, seventh, eighth, and ninth teeth 2 is reverse to that of the fourth, fifth, sixth, tenth, eleventh, and twelfth teeth 2.

The winding method of the excitation wire 7 is not particularly limited. However, it is possible to effectively wind the excitation wire 7 around the teeth 2 in the concentrated fashion by using a flyer type or nozzle type winding machine for winding one copper wire continuously to the teeth 2 with a linking portion between the adjacent teeth 2 being twined around a twining member formed on the stator core 6. Note that it is possible to arbitrarily decide to wind the excitation wire 7 positively (or negatively) on the group of the first, second, third, seventh, eighth, and ninth teeth 2 or the group of the fourth, fifth, sixth, tenth, eleventh, and twelfth teeth 2.

As shown in FIG. 3, the SIN output wire 8 is wound around the teeth 2 intermittently as being wound around alternate teeth 2 by a predetermined number of turnings in the concentrated fashion. More specifically, the SIN output wire 8 is wound around each of the second, fourth, sixth, eighth, tenth, and twelfth teeth 2. The SIN output wire 8 is wound in such a fashion that the second, fourth, and twelfth teeth 2 have an identical polarity and the sixth, eighth, and tenth teeth 2 have a polarity that is reverse to the polarity of the second, fourth, and twelfth teeth 2. When the SIN output wire 8 is wound around each of the second, fourth, and twelfth teeth 2 positively, the SIN output wire 8 is wound around each of the sixth, eighth, and tenth teeth 2 negatively. The SIN output wire 8 is wound around each of the second, fourth, sixth, eighth, tenth, and twelfth teeth 2 in series.

By thus winding the SIN output wire 8, the SIN output wire 8 wound around the second, fourth, and twelfth teeth 2 is identical in polarity, and the SIN output wire 8 wound around the sixth, eighth, and tenth teeth 2 is identical in polarity. The polarity of the SIN output wire 8 on the second, fourth, and twelfth teeth 2 is reverse to that of the sixth, eighth, and tenth teeth 2.

As shown in FIG. 3, the COS output wire 9 is wound around the teeth intermittently as being wound around alternate teeth 2 by a predetermined number of turnings in the concentrated fashion. More specifically, the COS output wire 9 is wound around each of the third, fifth, seventh, ninth, eleventh, and first teeth 2. The COS output wire 9 is wound in such a fashion that the third, fifth, and seventh teeth 2 have an identical polarity and the ninth, eleventh, and first teeth 2 have a polarity that is reverse to the polarity of the third, fifth, and seventh tooth 2. When the COS output wire 9 is wound around each of the third, fifth, and seventh teeth 2 positively, the COS output wire 9 is wound around each of the ninth, eleventh, and first teeth 2 negatively. The COS output wire 9 is wound around each of the third, fifth, seventh, ninth, eleventh, and first teeth 2 in series.

By thus winding the COS output wire 9, the COS output wire 9 wound around the third, fifth, and seventh teeth 2 is identical in polarity, and the COS output wire 9 wound around the ninth, eleventh, and first teeth 2 is identical in polarity. The polarity of the COS output sire 9 on the third, fifth, and seventh teeth 2 is reverse to that of the ninth, eleventh, and first teeth 2.

Thus, the SIN output wire 8 and the COS output wire 9 are different in phase from each other by 90 degrees. Therefore, with an input voltage by the excitation wire 7, a SIN output voltage is obtained from the SIN output wire 8, and a COS output voltage is obtained form the COS output wire 9.

The winding methods of the SIN output wire 8 and the COS output wire 9 are not particularly limited. It is possible to effectively wind the SIN output wire 8 and the COS output wire 9 around the teeth 2 in the concentrated fashion use a flyer type or nozzle type winding machine for winding one copper wire continuously to the teeth 2 with a linking portion between the adjacent teeth being twined around a twining member formed on the stator core 6, as is the case with the excitation wire 7. Also, the order of winding each of the SIN output wire 8 and the COS output wire 9 around the teeth 2 is not particularly limited. Therefore, the COS output wire 9 may be wound around the first, third, fifth, seventh, ninth, and eleventh teeth in this order in series, for example.

Thus, it is possible to obtain an output higher than that of the conventional example by the variable reluctance type angle detector 1 by winding each of the SIN output wire 8 and the COS output wire 9 around on the teeth 2 by the number of turnings which is similar to the conventional example. Accordingly, since it is possible to reduce the number of turnings, it is possible to use the stator core 6 having a smaller slot capacity. Therefore, it is possible to realize downsizing of the variable reluctance type angle detector 1. Also, since the number of turnings of each of the SIN output wire 8 and the COS output wire 9 is reduced, it is possible to reduce the time required for winding work. Therefore, it is possible to realize a reduction in cost for the variable reluctance type angle detector 1. When the number of turnings of each of the SIN output wire 8 and the COS output wire 9 in each of the teeth 2 is reduced, it is possible to readily adjust the number of turnings of each of the SIN output wire 8 and the COS output wire 9 for the purpose of correcting an error in output accuracy that can be caused by influences of processing error of the rotor 5 and the like.

The SIN output wire 8 and the COS output wire 9 are wound around each of the teeth 2 at positions that are different by 180 degrees without fail, i.e. around each of the opposite teeth 2 of the stator core 6. In the case where decentering is caused due to the possessing error of the rotor 5 and the like, an induced voltage generated on the SIN output wire 8 or the COS output wire 9 is cancelled by the SIN output wire 8 or the COS output wire 9 wound around the opposite tooth 2. Thus, a balance between the output voltages of the SIN output wire 8 and the COS output wire 9 is maintained.

The excitation wire 7 and the first output wire 8 or the second output wire 9 are wound around each of the teeth 2. That is, the coil 3 has a two-layer structure in each of the teeth 2. Accordingly, the variable reluctance type angle detector 1 is reduced in the number of interlayer parts that requires insulation as compared to the conventional example wherein the three-layer coil is formed on each of the teeth. Therefore, reliability of interlayer insulation of the coil 3 is improved. When the two-layer coil 3 is formed on each of the teeth 2, the total number of the coils 3 for the twelve teeth is 24, which is smaller than the number of total coils the conventional example wherein the three-layer coil is formed on each of the teeth. Therefore, the time required for winding work for forming the coils is reduced to realize the reduction in cost for the variable reluctance type angle detector 1.

In this invention, the SIN output wire 8 is wound around each of the second, fourth, sixth, eighth, tenth, and twelfth teeth 2, and the COS output wire 9 is wound around each of the third, fifth, seventh, ninth, eleventh, and first teeth 2; however, this invention is not limited to the variable reluctance type angle detector in which the SIN output wire 8 and the COS output wire 9 are not wound around any of the teeth 2 other than the above-specified teeth 2. Therefore, the SIN output wire 8 may be wound around any of the teeth 2 other than the second, fourth, sixth, eighth, tenth, and twelfth teeth 2 by a reduced number of turnings, and the COS output wire 9 may be wound around any of the teeth 2 other than the third, fifth, seventh, ninth, eleventh, and first teeth 2 by a reduced number of turnings in some cases. Note that the above case involves disadvantages of the tooth 2 having the three-layer coil, slightly reduced output efficiency, and the like. Also, in the case of winding the SIN output wire 8 or the COS output wire 9 on any of the teeth 2 other than the above-specified teeth 2, the number of turnings in the tooth 2 is up to 10% to 20% with respect to the number of turnings of the SIN output wire 8 or the COS output wire 9 on the above-specified teeth 2. When the SIN output wire 8 or the COS output wire 9 is wound around the tooth 2 by the number of turnings larger than the above range, improvement in output tends to be reduced.

Figure 4:
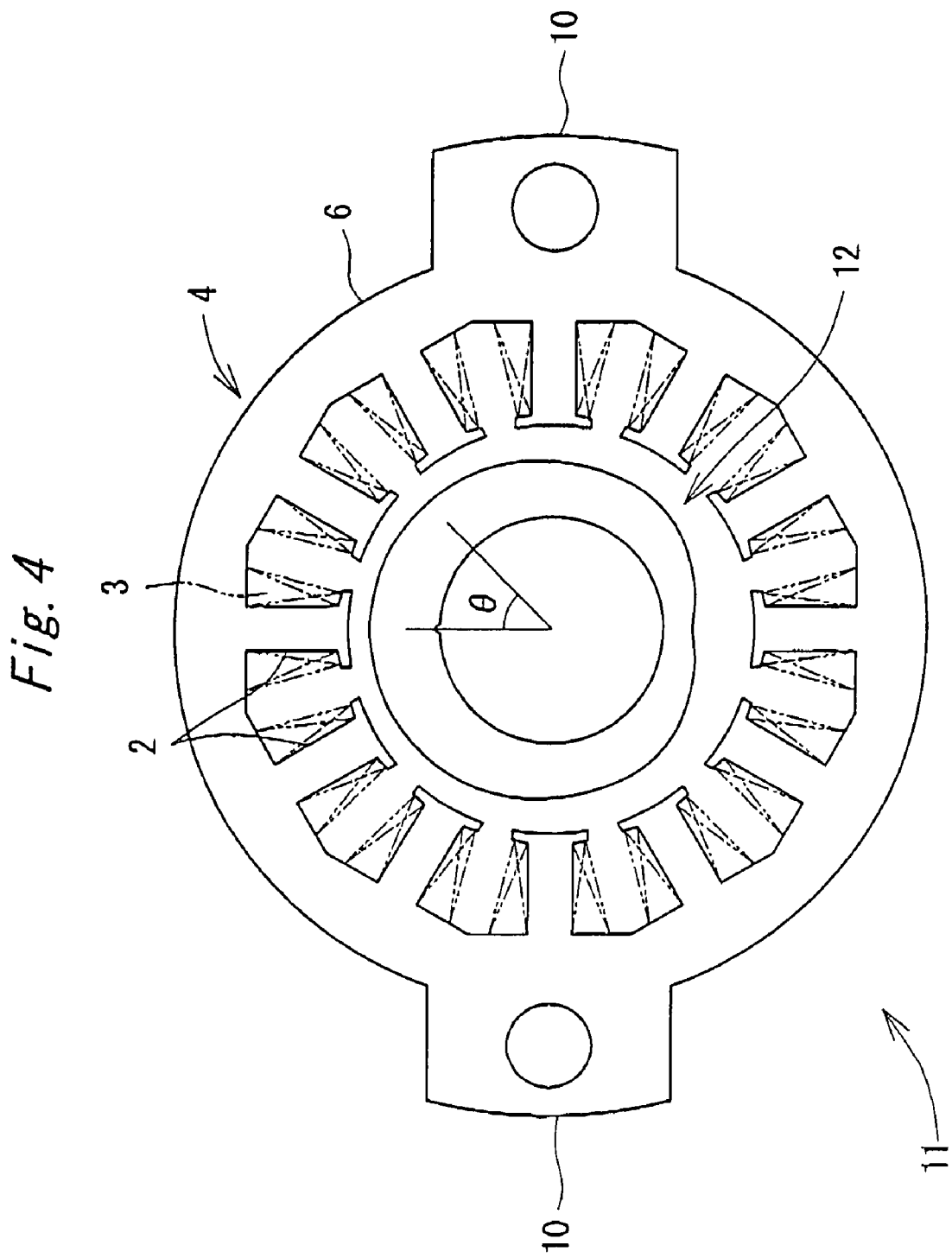
FIG. 4 is a plan view showing a major structure of a variable reluctance type angle detector 11 according to a modification example of this invention.
Figure 5:
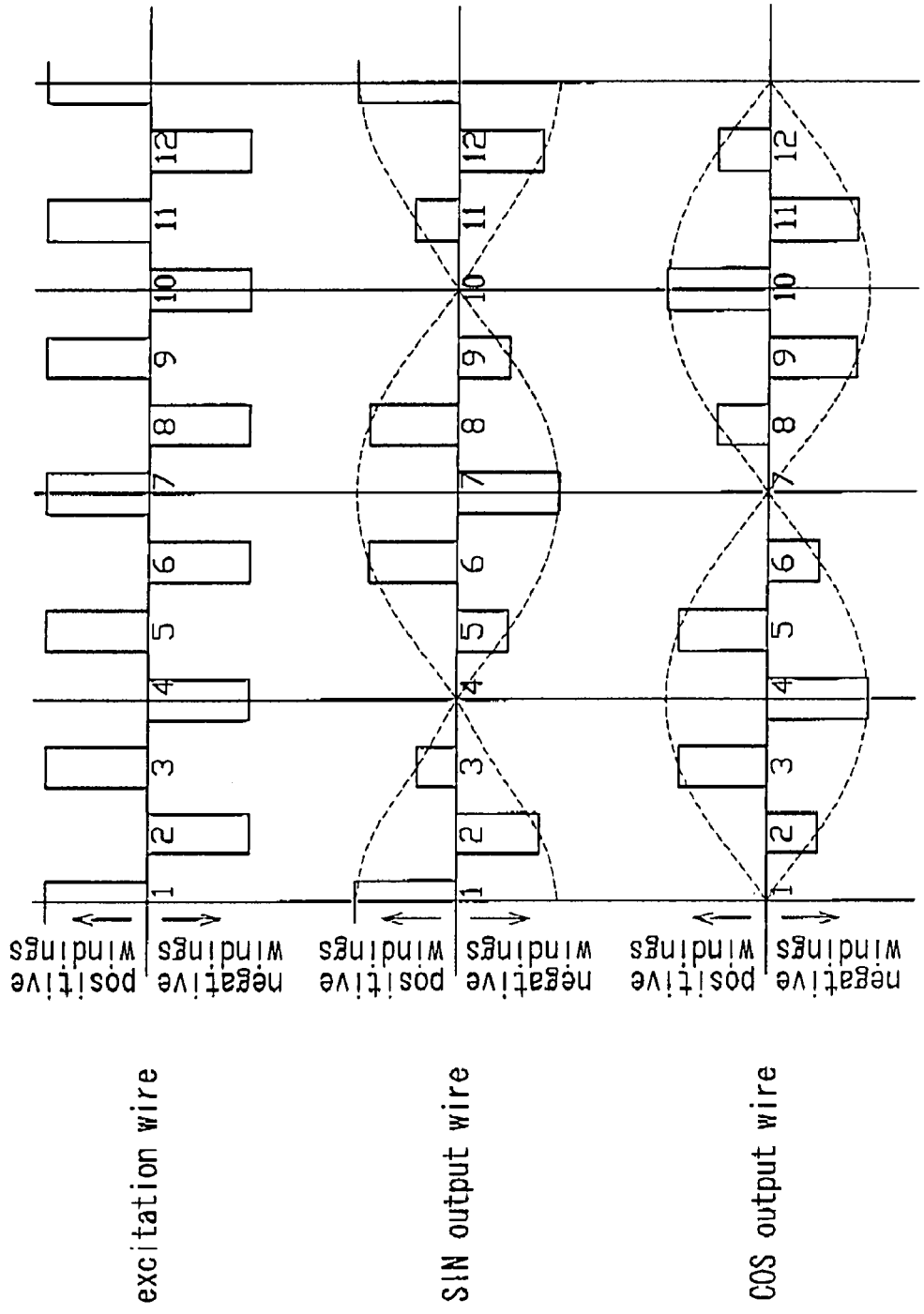
FIG. 5 is a schematic diagram for illustrating a method of winding an excitation wire and output wires of a conventional variable reluctance type angle detector.

Also, the variable reluctance type angle detector 1 of this embodiment has the rotor 5 having the axial double angle of 3×. However, this invention may be applied to a variable reluctance type angle detector having a rotor having an axial double angle of 1×. Shown in FIG. 4 is a major structure of a variable reluctance type angle detector 11 having a rotor 12 having an axial double angle of 1×. This variable reluctance type angle detector 11 is different from the above-described variable reluctance type angle detector 1 in structure of the rotor 5, and other structures are similar to those described in the foregoing. Therefore, members identical with those of the foregoing members are denoted by the same reference numerals.

As shown in FIG. 4, an outer shape of the rotor 12 is substantially circular. An outer periphery of the rotor 12 has the shape that is capable of varying a gap permeance between the rotor 12 and the stator 4 in a sine wave fashion with respect to an angle $\theta$ of a direction of rotation of the rotor 12. The rotor 12 of this embodiment is of a so-called axial double angle of 1× type, which has a projection and a depression at one point on the outer periphery. Like the rotor 5, the rotor 12 is obtainable by: pressing a steel plate having a predetermined thickness into the shape as shown in FIG. 1, which is the shape viewed from above; stacking a plurality of the steel plates; and fixing the steel plates by caulking or the like to integrate the steel plates into one plate, for example. A rotor shaft (not shown) is inserted into the center of the rotor 12.

Methods of winding the excitation wire 7, the SIN output wire 8, and the COS output wire 9 around the teeth 2 in the stator core 6 are the same as those described in the foregoing. Therefore, descriptions of the winding methods are omitted. The variable reflectance type angle detector 11 having the rotor 12 achieves effects that are the same as those of the variable reluctance type angle detector 1.

WORKING EXAMPLE

Hereinafter, Working Example of this invention will be described.

As Working Example, the variable reluctance type angle detector 1 having the same constitution as the above-described embodiment was manufactured. In a state where one of the projections of the rotor 5 of the axial double angle of 1× type was positioned opposed to the second tooth 2, a voltage of 10 V (O-P) was inputted to the excitation coils 7 to measure generated voltages of the coils on the second, fourth, sixth, eighth, tenth, and twelfth teeth 2 on which the SIN output wire 8 was wound.

As Comparative Example, a variable reluctance type angle detector wherein the excitation wire 7 is wound around the first to twelfth teeth 2 in such a fashion that a the teeth 2 have alternate polarities, and the SIN output wire 8 and the COS output wire 9 are wound in the same manner as in the above-described embodiment was manufactured. In a state where one of the projections of the rotor 5 of the axial double angle of 3× type was positioned opposed to the second tooth 2, a voltage of 10 V (O-P) was inputted to the excitation coils 7 to measure generated voltages of the coils on second, fourth, sixth, eighth, tenth, and twelfth teeth 2 on which the SIN output wire 8 was wound.

Measurement results are shown in Table 1.

TABLE 1

|  |  | Working Example | Comparative Example |
|---|---|---|---|
| generated voltage of a coil(O—P) | NO. 2 | +2.25 | +2.55 |
|  | NO. 4 | −1.65 | −1.65 |
|  | NO. 6 | +2.75 | +2.50 |
|  | NO. 8 | −1.15 | −1.70 |
|  | NO. 10 | +2.75 | +2.50 |
|  | NO. 12 | −1.65 | −1.65 |
| total output voltage |  | +3.30 | +2.55 |

As shown in Table 1, in the comparison between the respective generated voltages of the coils of Working Example and Comparative Example, a higher output is achieved by one of coils of Comparative Example as compared to the corresponding coil of Working Example. However, the total output voltage of Working Example is higher than that of Comparative Example. Note that, in the total output voltage comparison, the output value is higher when the absolute value of the sum of the generated voltages of the 6 coils is larger.

It is needless to say that it is possible to make many other modifications of this invention. Therefore, the foregoing embodiments are described for the purpose of illustration and not for the purpose of limitation. Modifications existing in the spirit and scope of this invention are encompassed by this invention.

What is claimed is:

1. A variable reluctance type angle detector comprising a 1×-rotor or a 3×-rotor having such a shape that a gap permeance varies in a sine wave fashion with respect to an angle θ, the rotor being provided rotatably on a stator having teeth on which an excitation wire and output wires are wound, wherein the stator is provided with the teeth that are disposed in such a fashion that first to twelfth teeth are sequentially disposed along a circumferential direction;

the excitation wire is wound around each of the first, second, third, seventh, eighth, and ninth teeth in a concentrated fashion to generate an identical polarity and wound around each of the fourth, fifth, sixth, tenth, eleventh, and twelfth teeth in the concentrated fashion to generate a polarity that is reverse to the polarity of the first, second, third, seventh, eighth, and ninth teeth;

the first output wire is wound around each of the second, fourth, and twelfth teeth in the concentrated fashion to generate an identical polarity and wound around each of the sixth, eighth, and tenth teeth in the concentrated fashion to generate a polarity that is reverse to the polarity of the second, fourth, and twelfth teeth; and the second output wire is wound around each of the third, fifth, and seventh teeth in the concentrated fashion to generate an identical polarity and wound around each of the ninth, eleventh, and first teeth in the concentrated fashion to generate a polarity that is reverse to the polarity of the third, fifth, and seventh teeth.

* * * * *